(12) United States Patent
Minagawa

(10) Patent No.: US 9,540,493 B2
(45) Date of Patent: Jan. 10, 2017

(54) SURFACE MODIFICATION METHOD AND SURFACE-MODIFIED ELASTIC BODY

(71) Applicant: SUMITOMO RUBBER INDUSTRIES, LTD., Kobe-shi, Hyogo (JP)

(72) Inventor: Yasuhisa Minagawa, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/107,746

(22) Filed: Dec. 16, 2013

(65) Prior Publication Data

US 2014/0194547 A1 Jul. 10, 2014

(30) Foreign Application Priority Data

Jan. 7, 2013 (JP) ................. 2013-000645

(51) Int. Cl.
C08J 7/18 (2006.01)
C08F 2/50 (2006.01)
C08F 291/00 (2006.01)

(52) U.S. Cl.
CPC .. *C08J 7/18* (2013.01); *C08F 2/50* (2013.01); *C08F 291/00* (2013.01); *C08J 2311/00* (2013.01)

(58) Field of Classification Search
None
See application file for complete search history.

(56) References Cited

U.S. PATENT DOCUMENTS 3,418,066 A 12/1968 Caldwell et al.
5,100,689 A 3/1992 Goldberg et al.
(Continued)

FOREIGN PATENT DOCUMENTS

EP 0 872 512 A2 10/1998
EP 2 894 191 A1 7/2015
(Continued)

OTHER PUBLICATIONS

Allmér et al., "Surface Modification of Polymers. I. Vapour Phase Photografting with Acrylic Acid," Journal of Polymer Science: Part A: Polymer Chemistry, vol. 26, 1988, pp. 2099-2111.
(Continued)

*Primary Examiner* — Michael P Rodriguez
(74) *Attorney, Agent, or Firm* — Birch, Stewart, Kolasch & Birch, LLP

(57) ABSTRACT

The present invention aims to provide a method for surface-modifying a rubber vulcanizate or a thermoplastic elastomer, which is capable of cost-effectively imparting a variety of functions, such as sliding properties and biocompatibility, according to the applications. The present invention relates to a surface modification method for surface-modifying an object of a rubber vulcanizate or a thermoplastic elastomer, the method including: step 1 of forming polymerization initiation points A on a surface of the object; step 2 of radically polymerizing a non-functional monomer, starting from the polymerization initiation points A, to grow non-functional polymer chains; step 3 of forming polymerization initiation points B on the surface of the object where the non-functional polymer chains are formed; and step 4 of radically polymerizing a functional monomer, starting from the polymerization initiation points B, to grow functional polymer chains.

15 Claims, 1 Drawing Sheet

(56) References Cited

U.S. PATENT DOCUMENTS

| | | | |
|---|---|---|---|
| 5,340,879 A | 8/1994 | Audenaert et al. | |
| 5,637,460 A * | 6/1997 | Swan | A61K 47/48169 435/181 |
| 5,885,566 A | 3/1999 | Goldberg | |
| 5,967,714 A | 10/1999 | Ottersbach et al. | |
| 6,001,894 A * | 12/1999 | Ottersbach | C08J 7/18 427/520 |
| 6,203,856 B1 | 3/2001 | Ottersbach et al. | |
| 6,358,557 B1 | 3/2002 | Wang et al. | |
| 6,808,738 B2 | 10/2004 | Ditizio et al. | |
| 7,348,055 B2 | 3/2008 | Chappa et al. | |
| 8,840,927 B2 | 9/2014 | Ditizio et al. | |
| 2002/0161065 A1 | 10/2002 | Ditizio et al. | |
| 2004/0086568 A1 | 5/2004 | Ditizio et al. | |
| 2004/0106732 A1* | 6/2004 | Tsuji | C08F 293/00 525/94 |
| 2007/0003592 A1* | 1/2007 | Hissink | A61K 9/0024 424/426 |
| 2007/0116971 A1 | 5/2007 | Yoshikawa et al. | |
| 2008/0016644 A1 | 1/2008 | Mizote et al. | |
| 2008/0312377 A1* | 12/2008 | Schmidt | C08F 293/00 525/88 |
| 2011/0160357 A1 | 6/2011 | Gerster et al. | |
| 2013/0203883 A1* | 8/2013 | Minagawa | C08F 255/10 522/35 |
| 2013/0274367 A1* | 10/2013 | Minagawa | C08F 2/38 522/129 |
| 2013/0310772 A1 | 11/2013 | Minagawa | |
| 2014/0039084 A1 | 2/2014 | Minagawa | |
| 2014/0128493 A1 | 5/2014 | Minagawa | |
| 2015/0203612 A1* | 7/2015 | Minagawa | C08F 2/50 522/46 |

FOREIGN PATENT DOCUMENTS

| | | | |
|---|---|---|---|
| GB | 1120803 A | 7/1968 | |
| GB | 1120804 A | 7/1968 | |
| JP | 61-209667 A | 9/1986 | |
| JP | 62-87163 A | 4/1987 | |
| JP | 63-92658 A | 4/1988 | |
| JP | 5-179055 A | 7/1993 | |
| JP | 6-25450 A | 2/1994 | |
| JP | 8-001793 A | 1/1996 | |
| JP | 9-67457 A | 3/1997 | |
| JP | 9-108359 A | 4/1997 | |
| JP | 10-251350 A | 9/1998 | |
| JP | 10-298320 A | 11/1998 | |
| JP | 2001-95621 A | 4/2001 | |
| JP | 2002-145971 A | 5/2002 | |
| JP | 2003-2903 A | 1/2003 | |
| JP | 2003-510378 A | 3/2003 | |
| JP | 2004-528418 A | 9/2004 | |
| JP | 2004-298220 A | 10/2004 | |
| JP | 2005-213516 A | 8/2005 | |
| JP | 2007-119563 A | 5/2007 | |
| JP | 2007-145884 A | 6/2007 | |
| JP | 2009-30074 A | 2/2009 | |
| JP | 2009-138169 A | 6/2009 | |
| JP | 2010-23710 A | 2/2010 | |
| JP | 2010-142537 A | 7/2010 | |
| JP | 2010-142573 A | 7/2010 | |
| JP | 2010-150349 A | 7/2010 | |
| JP | 2011-189562 A | 9/2011 | |
| JP | 2011-219520 A | 11/2011 | |
| JP | 2011-241190 A | 12/2011 | |
| JP | WO 2012091169 A1 * | 7/2012 | C08F 2/38 |
| JP | 2012-162646 A | 8/2012 | |
| JP | 2013-159629 A | 8/2013 | |
| WO | WO 2007-072613 A1 | 6/2007 | |
| WO | WO 2011/038483 A1 | 4/2011 | |

OTHER PUBLICATIONS

International Search Report dated Dec. 3, 2013, for International Application No. PCT/JP2013/074219.

International Search Report, dated Jul. 24, 2012, for International Application No. PCT/JP2012/064030.

U.S. Non-Final Office Action dated May 8, 2015, for U.S. Appl. No. 13/756,837.

U.S. Notice of Allowance dated Dec. 26, 2014, for U.S. Appl. No. 13/956,974.

U.S. Office Action (Requirement for Restriction/Election), dated May 9, 2014, for U.S. Appl. No. 13/956,974.

U.S. Office Action dated Apr. 17, 2015, for U.S. Appl. No. 13/775,451.

U.S. Office Action dated Aug. 25, 2014, for U.S. Appl. No. 13/956,974.

U.S. Office Action dated Jun. 24, 2015, for U.S. Appl. No. 14/118,136.

U.S. Office Action dated Oct. 20, 2014, for U.S. Appl. No. 13/756,837.

* cited by examiner

SURFACE MODIFICATION METHOD AND SURFACE-MODIFIED ELASTIC BODY

TECHNICAL FIELD

The present invention relates to a surface modification method, and surface-modified elastic bodies such as a gasket for syringes at least partially having a surface modified by the surface modification method, and a tire at least partially having a groove surface modified by the surface modification method.

BACKGROUND ART

In view of the importance of sealing properties, elastic bodies (e.g., rubber) are used for parts that slide while maintaining their sealing performance, for example, a gasket which is integrated with a syringe plunger and forms a seal between the plunger and barrel. Such elastic bodies, however, have a slight problem with the sliding properties (see Patent Literature 1). Thus, a sliding property improving agent (e.g., silicone oil) is applied to the sliding surface; however, a concern has been raised over the potential adverse effects of silicone oil on recently marketed biopreparations. Meanwhile, gaskets which are not coated with any sliding property improving agents have poor sliding properties, and thus do not allow plungers to be smoothly pushed, causing them to pulsate during administration. Hence, some problems occur such as an inaccurate injection amount and infliction of pain on patients.

In order to simultaneously satisfy these conflicting requirements, that is, sealing properties and sliding properties, a technique of coating with a self-lubricating PTFE film is proposed (see Patent Literature 2). PTFE films, however, are generally expensive and increase the production cost of processed products. Thus, the range of applications of the films is limited. Also, products coated with PTFE films might not be reliable when they are used in applications in which sliding or the like motion is repeated and durability is thereby required. Another problem is that since PTFE is sensitive to radiation, it cannot be sterilized by radiation.

Consideration may also be given to the use in other applications where sliding properties are required in the presence of water. Specifically, water can be delivered without a loss by reducing the fluid resistance of the inner surface of a pre-filled syringe or of the inner surface of a pipe or tube for delivering water, or by making the contact angle with water large or greatly small. Also, drainage of water on wet roads and of snow on snowy roads can be improved by reducing the fluid resistance of the groove surface of tires, or by making the contact angle with water large or greatly small. This results in enhanced grip performance and improved hydroplaning performance, leading to better safety. In addition, less adhesion of wastes and dusts can be expected when the sliding resistance of the sidewall surfaces of tires or walls of buildings is reduced, or when their contact angle with water is increased.

Further advantageous effects can be expected, such as: less pressure loss when water, an aqueous solution or the like is delivered through a diaphragm such as a diaphragm pump or valve; easy sliding of skis or snowboards achieved by enhancing the sliding properties of the sliding surfaces thereof; better noticeability of road signs or signboards achieved by enhancing the sliding properties thereof to allow snow to slide easily on the surface; reduction in water resistance or drag on the outer peripheries of ships and therefore less adhesion of bacteria on the outer peripheries, achieved by reducing the sliding resistance of the outer peripheries or by increasing the contact angle with water; and reduction in water resistance or drag of swimsuits achieved by improving the sliding properties of the thread surfaces thereof.

CITATION LIST

Patent Literature

Patent Literature 1: JP 2004-298220 A
Patent Literature 2: JP 2010-142537 A

SUMMARY OF INVENTION

Technical Problem

The present invention aims to solve the above problems and provide a method for surface-modifying a rubber vulcanizate or a thermoplastic elastomer, which is capable of cost-effectively imparting a variety of functions, such as sliding properties and biocompatibility, according to the applications. The present invention also aims to provide surface-modified elastic bodies, such as a gasket for syringes at least partially having a surface modified by the surface modification method, and a tire at least partially having a groove surface modified by the surface modification method.

Solution to Problem

The present invention relates to a surface modification method for surface-modifying an object of a rubber vulcanizate or a thermoplastic elastomer, the method including:
step 1 of forming polymerization initiation points A on a surface of the object;
step 2 of radically polymerizing a non-functional monomer, starting from the polymerization initiation points A, to grow non-functional polymer chains;
step 3 of forming polymerization initiation points B on the surface of the object where the non-functional polymer chains are formed; and
step 4 of radically polymerizing a functional monomer, starting from the polymerization initiation points B, to grow functional polymer chains.

Preferably, the step 1 includes adsorbing a polymerization initiator A onto the surface of the object to form the polymerization initiation points A, and the step 3 includes adsorbing a polymerization initiator B onto the surface of the object where the non-functional polymer chains are formed, to form the polymerization initiation points B.

Preferably, the step 1 includes irradiating the surface of the object with LED light with a wavelength of 300 to 400 nm and forming the polymerization initiation points A from a polymerization initiator A present on the surface, and the step 3 includes irradiating the surface of the object where the non-functional polymer chains are formed with LED light with a wavelength of 300 to 400 nm and forming the polymerization initiation points B from a polymerization initiator B present on the surface.

The rubber vulcanizate or thermoplastic elastomer preferably contains an allylic carbon atom which is a carbon atom adjacent to a double bond.

The polymerization initiator is preferably a benzophenone compound and/or a thioxanthone compound.

The step 2 and the step 4 preferably include adding a reducing agent or an antioxidant in the radical polymerization of the non-functional monomer and/or the functional monomer. The reducing agent or antioxidant is preferably at least one selected from the group consisting of riboflavin, ascorbic acid, α-tocopherol, β-carotene, and uric acid.

In the surface modification method, the radical polymerization preferably includes inserting an inert gas into a reaction container and a reaction solution during or before light irradiation, and polymerizing the monomer in an atmosphere replaced with the inert gas.

The non-functional monomer is preferably at least one selected from the group consisting of acrylic acid, acrylic acid esters, acrylic acid alkali metal salts, acrylic acid amine salts, methacrylic acid, methacrylic acid esters, methacrylic acid alkali metal salts, methacrylic acid amine salts, acrylonitrile, acrylamide, dimethylacrylamide, diethylacrylamide, isopropylacrylamide, hydroxyacrylamide, acryloyl morpholine, methacrylamide, dimethylmethacrylamide, diethylmethacrylamide, isopropylmethacrylamide, hydroxymethacrylamide, and methacryloyl morpholine.

The functional monomer is preferably a fluoro group-containing monomer. The fluoro group-containing monomer is preferably a fluoroalkyl group-containing monomer.

The fluoroalkyl group-containing monomer is preferably at least one selected from the group consisting of 3,3,4,4,5,5,6,6,7,7,8,8,9,9,10,10,11,11,12,12,12-heneicosafluorododecyl acrylate ($H_2C=CHCO_2CH_2CH_2(CF_2)_9CF_3$) 3,3,4,4,5,5,6,6,7,7,8,8,9,9,10,10,10-heptadecafluorodecyl acrylate ($H_2C=CHCO_2CH_2CH_2(CF_2)_7CF_3$), 3-(perfluorobutyl)-2-hydroxypropyl acrylate ($F(CF_2)_4CH_2CH(OH)CH_2OCOCH=CH_2$), 3-perfluorohexyl-2-hydroxypropyl acrylate ($F(CF_2)_6CH_2CH(OH)CH_2OCOCH=CH_2$), 3-(perfluoro-3-methylbutyl)-2-hydroxypropyl acrylate (($CF_3)_2CF(CF_2)_2CH_2CH(OH)CH_2OCOCH=CH_2$), and 3-(perfluoro-5-methylhexyl)-2-hydroxypropyl acrylate (($CF_3)_2CF(CF_2)_4CH_2CH(OH)CH_2OCOCH=CH_2$).

The fluoroalkyl group-containing monomer is preferably a compound represented by the following formula (3), (4), (5), or (6):

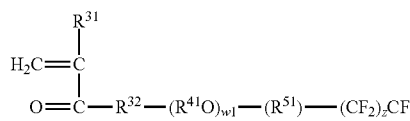

(3)

wherein $R^{31}$ represents a hydrogen atom, a methyl group, an ethyl group, or a propyl group; $R^{32}$ represents —O— or —NH—; $R^{41}$ represents a methylene group, an ethylene group, or a propylene group; $R^{51}$ represents a ketone group or is absent; w1 represents an integer of 1 to 100; and z represents an integer of 1 to 6,

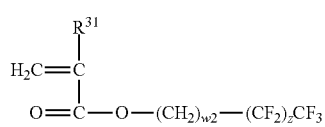

(4)

wherein $R^{31}$ represents a hydrogen atom, a methyl group, an ethyl group, or a propyl group; w2 represents an integer of 4 to 10; and z represents an integer of 1 to 6,

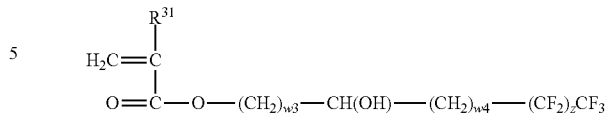

(5)

wherein $R^{31}$ represents a hydrogen atom, a methyl group, an ethyl group, or a propyl group; w3 and w4 each independently represent an integer of 1 to 6; and z represents an integer of 1 to 6,

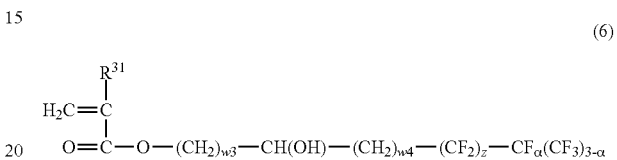

(6)

wherein $R^{31}$ represents a hydrogen atom, a methyl group, an ethyl group, or a propyl group; w3 and w4 each independently represent an integer of 1 to 6; z represents an integer of 1 to 6; and α represents an integer of 0 to 2.

The fluoro group-containing monomer is preferably a fluoroalkylene oxide group-containing monomer or a fluorobenzyl group-containing monomer.

The fluoro group-containing monomer may also suitably be at least one selected from the group consisting of [1H,1H-perfluoro(2,5-dimethyl-3,6-dioxanonanoyl)]acrylate, [1H,1H-perfluoro(2,5-dimethyl-3,6-dioxanonanoyl)]methacrylate, pentafluorobenzyl acrylate, pentafluorobenzyl methacrylate, and 2,3,5,6-tetrafluorophenyl methacrylate.

The functional monomer may suitably be a zwitterionic monomer that has a carboxybetaine group, a sulfobetaine group or a phosphobetaine group in a side chain thereof. Also, the functional monomer may suitably be at least one selected from the group consisting of 2-(meth)acryloyloxyethyl phosphorylcholine, 2-(meth)acryloyloxyethyl carboxybetaine, and 2-(meth)acryloyloxyethyl sulfobetaine. Furthermore, the functional monomer may suitably be silver acrylate and/or silver methacrylate.

In the surface modification method, preferably, the (liquid) nonfunctional monomer, the (liquid) functional monomer, or a solution thereof contains a polymerization inhibitor, and is polymerized in the presence of the polymerization inhibitor. The polymerization inhibitor is preferably 4-methylphenol.

Preferably, total polymer chains including the non-functional polymer chains and the functional polymer chains each have a length of 10 to 50000 nm.

A ratio between a length of the non-functional polymer chain and a length of the functional polymer chain is preferably 50:50 to 99.9:0.01.

The present invention relates to a surface-modified elastic body, which is obtained by the aforementioned surface modification method.

The present invention relates to a surface-modified elastic body, which is required to have sliding properties, low friction, or low water resistance, in the presence of water or in a dry state, and which is obtained by the aforementioned surface modification method.

The present invention also relates to a surface-modified elastic body, including a three-dimensional solid at least partially having a surface modified by the aforementioned surface modification method. The surface-modified elastic body is preferably a polymer brush.

The present invention relates to a gasket for syringes, at least partially having a surface modified by the aforementioned surface modification method.

The present invention also relates to a tire, at least partially having a groove surface modified by the aforementioned surface modification method.

Advantageous Effects of Invention

The present invention provides a surface modification method for surface-modifying an object of a rubber vulcanizate or a thermoplastic elastomer, the method including: step 1 of forming polymerization initiation points A on a surface of the object; step 2 of radically polymerizing a non-functional monomer, starting from the polymerization initiation points A, to grow non-functional polymer chains; step 3 of forming polymerization initiation points B on the surface of the object where the non-functional polymer chains are formed; and step 4 of radically polymerizing a functional monomer, starting from the polymerization initiation points B, to grow functional polymer chains. Thus, functional polymer chains are formed on the surface of the object modified, and therefore desired functions can be imparted. Moreover, since the surface of the object modified has not only the functional polymer chains but also non-functional polymer chains, the method is cost effective.

DESCRIPTION OF EMBODIMENTS

Figure 1:
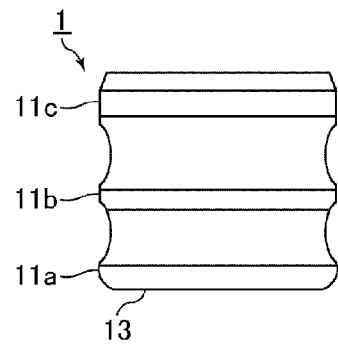
FIG. 1 is an exemplary side view of an embodiment of the gasket for syringes.

The surface modification method according to the present invention is a method for surface-modifying an object of a rubber vulcanizate or a thermoplastic elastomer, the method including:
step 1 of forming polymerization initiation points A on a surface of the object;
step 2 of radically polymerizing a non-functional monomer, starting from the polymerization initiation points A, to grow non-functional polymer chains;
step 3 of forming polymerization initiation points B on the surface of the object where the non-functional polymer chains are formed; and
step 4 of radically polymerizing a functional monomer, starting from the polymerization initiation points B, to grow functional polymer chains.

In order to form polymer chains on the surface of a rubber vulcanizate or thermoplastic elastomer to impart a function, it is normally required to form polymer chains having the desired function. However, since functional monomers are generally very expensive, the use of such monomers is economically disadvantageous unless polymer chains are formed therefrom in the minimum amount required to produce the desired function. In this regard, the surface modification method of the present invention includes the polymerization of a functional monomer to form the minimum required amount of functional polymer chains on the surface of the object to be modified, as well as the formation of polymer chains from an inexpensive non-functional monomer. Thus, the method of the present invention can very cost-effectively provide surface modified elastic bodies which have desired functions such as sliding properties, biocompatibility, or antibacterial properties.

For example, if functional polymer chains are formed from a fluoroalkyl group-containing monomer, which has low surface free energy, as the functional monomer, the surface having the polymer chains has high sliding properties. Moreover, since functional monomers having a carboxybetaine, sulfobetaine, or phosphobetaine (phosphoryl) group in a side chain have biocompatibility, the use of such monomers prevents adsorption and aggregation of proteins in bio-preparations. Furthermore, the use of monomers having an antibacterial substance (e.g., silver) in a side chain enables to produce an antibacterial effect.

In the step 1, polymerization initiation points A are formed on the surface of a molded vulcanized rubber or a molded thermoplastic elastomer (object to be modified).

The rubber vulcanizate or thermoplastic elastomer may suitably be one containing a carbon atom (allylic carbon atom) adjacent to a double bond.

Examples of the rubber as the object to be modified include diene rubbers such as styrene-butadiene rubber, butadiene rubber, isoprene rubber, natural rubber, and deproteinized natural rubber; and butyl rubber and halogenated butyl rubber which have a degree of unsaturation of a few percent of isoprene units. The butyl rubber or halogenated butyl rubber, if used, is preferably a rubber crosslinked by triazine because the amount of matter extracted from the rubber vulcanizate is small. In this case, the rubber may contain an acid acceptor. Examples of suitable acid acceptors include hydrotalcite and magnesium carbonate.

In cases where other rubbers are used, sulfur vulcanization is preferred. In such cases, compounding agents commonly used for sulfur vulcanization may be added, such as vulcanization accelerators, zinc oxide, fillers, and silane coupling agents. Suitable examples of fillers include carbon black, silica, clay, talc, and calcium carbonate.

The vulcanization conditions for rubber may be appropriately set. The vulcanization temperature for rubber is preferably 150° C. or higher, more preferably 170° C. or higher, and further preferably 175° C. or higher.

Examples of the thermoplastic elastomer include polymer compounds that have rubber elasticity at room temperature owing to the aggregates of the plastic components (hard segments) serving as crosslinking points (e.g., thermoplastic elastomers (TPE) such as styrene-butadiene-styrene copolymers); and polymer compounds having rubber elasticity, obtained by mixing a thermoplastic component and a rubber component and dynamically crosslinking the mixture by a crosslinking agent (e.g., thermoplastic elastomers (TPV) such as polymer alloys containing a styrenic block copolymer or olefinic resin together with a crosslinked rubber component).

Other suitable examples of the thermoplastic elastomer include nylon, polyester, polyurethane, polypropylene, and dynamically crosslinked thermoplastic elastomers thereof. In the case of using dynamically crosslinked thermoplastic elastomers, preferred are those obtained by dynamically crosslinking halogenated butyl rubber in a thermoplastic elastomer. This thermoplastic elastomer may preferably be nylon, polyurethane, polypropylene, SIBS (styrene-isobutylene-styrene block copolymer) or the like.

The polymerization initiation points A can be formed, for example, by adsorbing a polymerization initiator A onto the surface of the object to be modified. Examples of the polymerization initiator A include carbonyl compounds, organic sulfur compounds (e.g., tetraethylthiuram disulfide), persulfides, redox compounds, azo compounds, diazo compounds, halogen compounds, and photoreductive pigments. Preferred among these are carbonyl compounds.

The carbonyl compound as the polymerization initiator A is preferably benzophenone or its derivative, and may suitably be a benzophenone compound represented by the following formula (1-1):

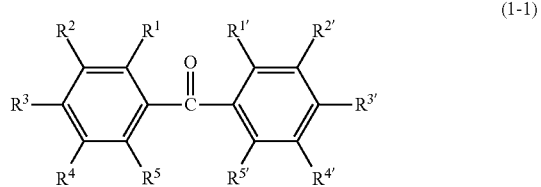
(1-1)

wherein $R^1$ to $R^5$ and $R^{1'}$ to $R^{5'}$ are the same as or different from one another and each represent a hydrogen atom, an alkyl group, a halogen (fluorine, chlorine, bromine, or iodine), a hydroxy group, a primary, secondary or tertiary amino group, a mercapto group, or a hydrocarbon group that may contain an oxygen atom, a nitrogen atom or a sulfur atom; and any two adjacent groups thereof may be joined to each other to form a cyclic structure together with the carbon atoms to which they are bonded.

Specific examples of the benzophenone compound include benzophenone, xanthone, 9-fluorenone, 2,4-dichlorobenzophenone, methyl o-benzoylbenzoate, 4,4'-bis(dimethylamino)benzophenone, and 4,4'-bis(diethylamino)benzophenone. Particularly preferred among these are benzophenone, xanthone, and 9-fluorenone, because they contribute to production of favorable polymer brushes. Other suitable examples of the benzophenone compound include fluorobenzophenone compounds such as 2,3,4,5,6-pentafluorobenzophenone and decafluorobenzophenone.

Thioxanthone compounds can also be suitably used as the polymerization initiator A because they provide a high polymerization rate, and can easily be adsorbed on and/or reacted with rubber or the like. For example, compounds represented by the following formula (1-2) can be suitably used.

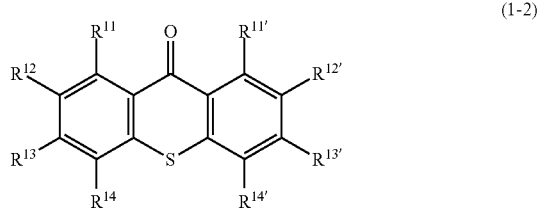
(1-2)

In the formula, $R^{11}$ to $R^{14}$ and $R^{11'}$ to $R^{14'}$ are the same as or different from one another and each represent a hydrogen atom, a halogen atom, an alkyl group, a cyclic alkyl group, an aryl group, an alkenyl group, an alkoxy group, or an aryloxy group.

Examples of the thioxanthone compounds represented by the formula (1-2) include thioxanthone, 2-isopropylthioxanthone, 4-isopropylthioxanthone, 2,3-diethylthioxanthone, 2,4-diethylthioxanthone, 2,4-dichlorothioxanthone, 2-methoxythioxanthone, 1-chloro-4-propoxythioxanthone, 2-cyclohexylthioxanthone, 4-cyclohexylthioxanthone, 2-vinylthioxanthone, 2,4-divinylthioxanthone, 2,4-diphenylthioxanthone, 2-butenyl-4-phenylthioxanthone, 2-methoxythioxanthone, and 2-p-octyloxyphenyl-4-ethylthioxanthene. Preferred among these are the compounds in which one or two, particularly two of the $R^{11}$ to $R^{14}$ and $R^{11'}$ to $R^{14'}$ are substituted with alkyl groups, and more preferred is 2,4-diethylthioxanthone.

The adsorption of the polymerization initiator A (e.g., benzophenone compounds, thioxanthone compounds) onto the surface of the object to be modified may be performed according to any known method. In the case of using a benzophenone compound or a thioxanthone compound, for example, the benzophenone compound or thioxanthone compound is dissolved in an organic solvent to prepare a solution; a surface portion of the object to be modified is treated with this solution so that the compound is adsorbed on the surface portion; and if necessary, the organic solvent is dried to be evaporated off, whereby polymerization initiation points A are formed. The surface-treating method may be any method that allows the solution of the benzophenone compound or thioxanthone compound to be brought into contact with the surface of the object to be modified. Suitable methods include application or spraying of the benzophenone compound solution or thioxanthone compound solution, and immersion of the surface into the solution. If only a part of the surface needs to be modified, it is sufficient to adsorb the polymerization initiator A only onto such a part of the surface. In this case, for example, application or spraying of the solution is suitable. Examples of the solvent include methanol, ethanol, acetone, benzene, toluene, methyl ethyl ketone, ethyl acetate, and THF. Acetone is preferred because it does not swell the object and it can be rapidly dried and evaporated off.

Preferably, after the target region to be modified is surface-treated with the benzophenone compound or thioxanthone compound solution so that the polymerization initiator A is adsorbed, the surface of the object to be modified is further irradiated with light so that the polymerization initiator is chemically bonded to the surface. For example, the benzophenone compound or thioxanthone compound solution can be fixed on the surface by irradiation with UV light with a wavelength of 300 to 450 nm (preferably 300 to 400 nm, more preferably 350 to 400 nm). During the step 1 and the fixing, hydrogen is abstracted from the rubber surface, and a carbon atom on the rubber surface is then covalently bonded to the carbon atom in C=O of benzophenone, while the abstracted hydrogen is bonded to the oxygen atom in C=O to form C—O—H. Moreover, since this hydrogen abstraction reaction selectively occurs on allylic hydrogen atoms in the object to be modified, the rubber preferably contains a butadiene or isoprene unit that contains an allylic hydrogen atom.

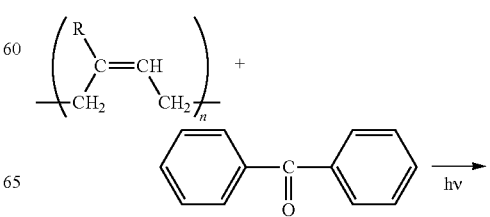

-continued

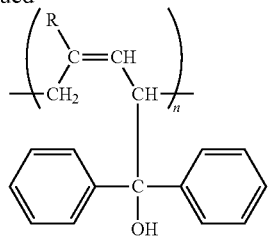

R: hydrogen or C1-C4 alkyl group

More preferably, the polymerization initiation points A are formed by treating the surface of the object with the polymerization initiator A so that the polymerization initiator A is adsorbed on the surface, and then irradiating the treated surface with LED light with a wavelength of 300 to 400 nm. Particularly preferably, after the surface of the object is surface-treated with the benzophenone compound or thioxanthone compound solution or the like so that the polymerization initiator A is adsorbed, the treated surface is irradiated with LED light with a wavelength of 300 to 400 nm so that the adsorbed polymerization initiator A is chemically bonded to the surface. The wavelength of the LED light is preferably 355 to 380 nm.

In the step 2, a non-functional monomer is radically polymerized starting from the polymerization initiation points A formed in the step 1, to grow non-functional polymer chains. Thus, non-functional polymer chains, which are formed by radical polymerization of a non-functional monomer, are formed on the surface of the object.

The non-functional monomer in the step 2 refers to a monomer capable of forming non-functional polymer chains that do not have functions appropriately set according to the application and the like. For example, in cases where such functions as sliding properties, biocompatibility, or antibacterial properties are imparted to the object to be modified, the non-functional monomer corresponds to a monomer that does not impart such functions, and may be appropriately selected from the viewpoint of economic efficiency and the like.

The non-functional monomer may be appropriately selected from the aforementioned viewpoints, and examples thereof include acrylic acid, acrylic acid esters (e.g., methyl acrylate, ethyl acrylate), acrylic acid alkali metal salts (e.g., sodium acrylate, potassium acrylate), acrylic acid amine salts, methacrylic acid, methacrylic acid esters (e.g., methyl methacrylate, ethyl methacrylate), methacrylic acid alkali metal salts (e.g., sodium methacrylate, potassium methacrylate), methacrylic acid amine salts, acrylonitrile, and the like.

The non-functional monomer may be a monomer containing a C—N bond in a molecule thereof. Examples of the monomer containing a C—N bond in a molecule thereof include (meth)acrylamide; N-alkyl substituted (meth)acrylamide derivatives (e.g., N-ethylacrylamide, N-n-propylacrylamide, N-n-propylmethacrylamide, N-isopropylacrylamide, N-isopropylmethacrylamide, N-cyclopropylacrylamide, N-cyclopropylmetacrylamide, N-ethoxyethylacrylamide, N-ethoxyethylmethacrylamide); N,N-dialkyl substituted (meth)acrylamide derivatives (e.g., N,N-dimethyl(meth) acrylamide, N,N-ethylmethylacrylamide, N,N-diethylacrylamide); hydroxy(meth)acrylamide; hydroxyacrylamide derivatives (e.g., N-hydroxyethyl(meth)acrylamide); and cyclic group-containing (meth)acrylamide derivatives (e.g., acryloyl morpholine). Preferred among these are acrylamide, dimethylacrylamide, diethylacrylamide, isopropylacrylamide, hydroxyacrylamide, acryloyl morpholine, methacrylamide, dimethylmethacrylamide, diethylmethacrylamide, isopropylmethacrylamide, hydroxymethacrylamide, and methacryloyl morpholine. The non-functional monomers may be used alone, or two or more thereof may be used in combination.

The method for radically polymerizing a non-functional monomer in the step 2 may be as follows. First, a (liquid) non-functional monomer or a solution thereof is applied (sprayed) to the surface of the object to which the benzophenone compound or the like is adsorbed or covalently bonded, or alternatively the object is immersed in a (liquid) non-functional monomer or a solution thereof. Then, the surface of the object is irradiated with light (e.g., ultraviolet light) to allow radical polymerization (photoradical polymerization) of the monomer to proceed, thereby growing non-functional polymer chains on the surface of the object. Alternatively, after the application, the surface of the object may be covered with a sheet of transparent glass, PET, polycarbonate, or the like, followed by irradiation of the covered surface with light (e.g., ultraviolet light) to allow radical polymerization (photoradical polymerization) of the monomer to proceed, thereby growing non-functional polymer chains on the surface of the object.

In the step 2, radical polymerization (photoradical polymerization) is preferably allowed to proceed by irradiating a non-functional monomer, to which a reducing agent or antioxidant is added, with light. This arrangement is preferred because the reducing agent or antioxidant scavenges oxygen in the system. The monomer, and the reducing agent or antioxidant added thereto may be mixed or separated from each other. Moreover, the object obtained in the step 1 may be brought into contact with the non-functional monomer before addition of the reducing agent or antioxidant. Alternatively, these components may be mixed together in advance before the mixture is brought into contact with the object.

Specifically, the radical polymerization may be performed as follows. For example, the object obtained in the step 1, on the surface of which the polymerization initiation points A of the polymerization initiator A are formed, is brought into contact (e.g., immersion, application) with a mixture of a (liquid) non-functional monomer or a solution thereof and a solution of a reducing agent or antioxidant, followed by light irradiation. Alternatively, the object is brought into contact with a (liquid) non-functional monomer or a solution thereof, and then a solution of a reducing agent or antioxidant is placed on the surface of the object, followed by light irradiation. As a result of the radical polymerization, non-functional polymer chains can be formed.

In the step 4 described later, in the case of using, for example, a fluoroalkyl group-containing monomer which has a specific gravity of more than 1 and is not water-miscible, a solution of the reducing agent or antioxidant is located over the (liquid) radical polymerizable monomer or a solution thereof while being separated therefrom.

The reducing agent or antioxidant is not particularly limited and may be any appropriate compound having a reduction or antioxidant effect. Examples thereof include vitamins A such as retinol, dehydroretinol, retinol acetate, retinol palmitate, retinal, retinoic acid, and vitamin A oil, and derivatives or salts thereof; carotenoids such as α-carotene, β-carotene, γ-carotene, cryptoxanthin, astaxanthin, and fucoxanthin, and derivatives thereof; vitamins B such as pyridoxine, pyridoxal, pyridoxal-5-phosphate, and pyridoxamine, and derivatives or salts thereof; vitamins C such as ascorbic acid, sodium ascorbate, ascorbyl stearate, ascorbyl palmitate, ascorbyl dipalmitate, and magnesium ascorbyl phosphate, and derivatives or salts thereof; vitamins D such as ergocalciferol, cholecalciferol, and 1,2,5-dihydroxy-cholecalciferol, and derivatives or salts thereof; vitamins E such as α-tocopherol, β-tocopherol, γ-tocopherol, δ-tocopherol, α-tocotrienol, β-tocotrienol, γ-tocotrienol, δ-tocotrienol, tocopherol acetate, and tocopherol nicotinate, and derivatives or salts thereof; trolox, and derivatives or salts thereof; dihydroxytoluene, butylhydroxytoluene, butylhydroxyanisole, dibutylhydroxytoluene, α-lipoic acid, dehydrolipoic acid, and glutathione, and derivatives or salts thereof; uric acid, erythorbic acid, erythorbates such as sodium erythorbate, and derivatives or salts thereof; gallic acid, gallates such as propyl gallate, and derivatives or salts thereof; rutin, rutins such as α-glycosyl rutin, and derivatives or salts thereof; tryptophan, and derivatives or salts thereof; histidine, and derivatives or salts thereof; cysteine derivatives or salts such as N-acetylcysteine, N-acetylhomocysteine, N-octanoylcysteine, and N-acetylcysteine methyl ester; cystine derivatives or salts such as N,N'-diacetylcystine dimethyl ester, N,N'-dioctanoylcystine dimethyl ester, and N,N'-dioctanoylhomocystine dimethyl ester; carnosine, and derivatives or salts thereof; homocarnosine, and derivatives or salts thereof; anserine, and derivatives or salts thereof; carcinine, and derivatives or salts thereof; dipeptide or tripeptide derivatives or salts containing histidine and/or tryptophan and/or histamine; flavonoids such as flavanone, flavone, anthocyanin, anthocyanidin, flavonol, quercetin, quercitrin, myricetin, fisetin, hamamelitannin, catechin, epicatechin, gallocatechin, epigallocatechin, epicatechin gallate, and epigallocatechin gallate; tannic acid, caffeic acid, ferulic acid, protocatechuic acid, calcone, oryzanol, carnosol, sesamol, sesamine, sesamolin, zingerone, curcumin, tetrahydrocurcumin, clovamide, deoxyclovamide, shogaol, capsaicine, vanillyamide, ellagic acid, bromphenol, flavoglaucin, melanoidin, riboflavin, riboflavin butyrate, flavin mononucleotide, flavin adenine nucleotide, ubiquinone, ubiquinol, mannitol, bilirubin, cholesterol, ebselen, selenomethionine, ceruloplasmin, transferrin, lactoferrin, albumin, superoxide dismutase, catalase, glutathione peroxidase, metallothionein, and O-phosphono-pyridoxylidene rhodamine. These may be used alone, or two or more of these may be used in combination.

Preferred among these are riboflavin, ascorbic acid, α-tocopherol, β-carotene, and uric acid, and particularly preferred are riboflavin and ascorbic acid, because of their high oxygen scavenging capability.

In the case of using a solution of the reducing agent or antioxidant, the concentration of the reducing agent or antioxidant is preferably $10^{-4}$ to 1% by mass, and more preferably $10^{-3}$ to 0.1% by mass.

The amount of the non-functional monomer may be appropriately adjusted depending on, for example, the length of the non-functional polymer chain to be formed. Also, the amount of the reducing agent or antioxidant may be appropriately adjusted from the viewpoint of the oxygen scavenging capability in the system, for example.

The solvent for application (spraying), the method for application (spraying), the method for immersion, the conditions for irradiation, and the like may be any conventionally known materials or methods. The solution of the non-functional monomer may be an aqueous solution of the monomer or a solution prepared by dissolving the monomer in an organic solvent that does not dissolve the polymerization initiator A (e.g., benzophenone compounds) to be used.

Furthermore, the (liquid) non-functional monomer or a solution thereof may contain a known polymerization inhibitor such as 4-methylphenol.

In the present invention, radical polymerization of the non-functional monomer is allowed to proceed by light irradiation after the (liquid) non-functional monomer or a solution thereof is applied to the object, or after the object is immersed in the (liquid) non-functional monomer or a solution thereof. Here, UV light sources with an emission wavelength mainly in the ultraviolet region can be suitably used, such as high-pressure mercury lamps, metal halide lamps, and LED lamps. The light dose may be appropriately adjusted in consideration of the polymerization time and uniform progress of the reaction. In order to prevent polymerization inhibition due to active gas such as oxygen in a reaction container, it is preferable to remove oxygen from the reaction container and the reaction solution during or before the light irradiation. Thus, for example, a method may appropriately be employed in which an inert gas, such as nitrogen gas or argon gas, is inserted into the reaction container and the reaction solution to discharge active gas such as oxygen from the reaction system to replace the atmosphere in the reaction system with the inert gas. In addition, in order to prevent the reaction inhibition due to oxygen or the like, for example, measures may appropriately be taken in which a UV light source is placed such that no air layer (oxygen content: 15% or higher) exists between the reaction container made of glass, plastics or the like, and the reaction solution or the object to be modified.

In the case of irradiation with ultraviolet light, the ultraviolet light preferably has a wavelength of 300 to 450 nm, more preferably 300 to 400 nm. This arrangement enables polymer chains to be favorably formed on the surface of the object to be modified. The light source may be a high-pressure mercury lamp, an LED with a center wavelength of 365 nm, an LED with a center wavelength of 375 nm, or the like. More preferred is irradiation with LED light at 300 to 400 nm, still more preferably at 355 to 380 nm. In particular, from the viewpoint of efficiency, preferred are, for example, LEDs with a center wavelength of 365 nm which is close to the excitation wavelength (366 nm) of benzophenone.

In the step 3, polymerization initiation points B are formed on the surface of the object where the non-functional polymer chains are formed in the step 2. The step 3 can be performed by techniques similar to those in the step 1, including adsorbing another polymerization initiator B onto the surface of the object where the non-functional polymer chains have been formed, and optionally further chemically bonding the polymerization initiator B to the surface. The polymerization initiator B may be a polymerization initiator as mentioned for the polymerization initiator A.

In the step 4, a functional monomer is radically polymerized starting from the polymerization initiation points B formed in the step 3, to grow functional polymer chains. The step 4 can be performed by techniques similar to those in the step 2, except that it is performed on the surface of the object where the polymerization initiation points B are additionally formed, and a functional monomer is used instead of the non-functional monomer. In this manner, functional polymer chains are further formed on the surface of the object where the non-functional polymer chains have been formed. As a result, a surface-modified elastic body having a desired function is obtained.

The functional monomer refers to a monomer capable of forming functional polymer chains that can produce a desired function. The functional monomer is, for example, a fluoroalkyl group-containing monomer in the case of imparting sliding properties; a zwitterionic monomer in the case of imparting biocompatibility; and silver (meth)acrylate in the case of imparting antibacterial properties.

The functional monomer may be appropriately selected according to the application and the like, as mentioned earlier, and may be a fluoro group-containing monomer. Examples of the fluoro group-containing monomer include fluoroalkyl group-containing monomers. The fluoroalkyl group-containing monomer may be any compound having one radical polymerizable group (e.g. vinyl) and at least one fluoroalkyl group. The fluoroalkyl group herein refers to an alkyl group in which at least one hydrogen atom is replaced by a fluorine atom. The fluoroalkyl group is preferably a $C_7$-$C_{30}$ fluoroalkyl group, and particularly preferably a $C_7$-$C_{30}$ fluoroalkyl group having a perfluoroalkyl group at an end thereof.

The fluoroalkyl group-containing monomer preferably has a fluorine atom content of not less than 45% by mass, more preferably not less than 50% by mass, of the molecular weight of the monomer.

The fluoroalkyl group-containing monomer may suitably be a compound represented by A-B wherein A represents a radical polymerizable group, and B represents a fluoroalkyl group. Examples thereof include those represented by the following formula:

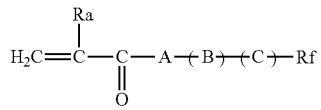

wherein Ra represents a hydrogen atom, a methyl group, an ethyl group, or a propyl group; A represents —O— or —NH—; B represents an optionally substituted alkylene or polyoxyalkylene group or is absent; C in the parenthesis represents a ketone group or is absent; and Rf represents an optionally substituted fluoroalkyl group.

The number of carbon atoms of the alkylene group represented as B is preferably 1 to 15. The polyoxyalkylene group represented as B is represented by $(RO)_w$ in which, preferably, the number of carbon atoms of R is 1 to 10 and the polymerization degree w is 1 to 150. The alkylene or polyoxyalkylene group may contain a substituent. Moreover, Rf is preferably a $C_2$-$C_{40}$ fluoroalkyl group having a perfluoroalkyl group at an end thereof, and may contain a substituent. Examples of the substituent for B or Rf include, but not limited to, a hydroxyl group.

From the viewpoint of easy polymerization, the fluoroalkyl group-containing monomer is preferably a compound represented by the following formula (2):

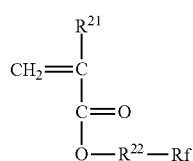

(2)

wherein $R^{21}$ represents a hydrogen atom, a methyl group, an ethyl group, or a propyl group; $R^{22}$ represents a $C_1$-$C_4$ alkylene group; and Rf represents a $C_7$-$C_{30}$ fluoroalkyl group having a perfluoroalkyl group at an end thereof.

$R^{21}$ is preferably a hydrogen atom or a methyl group. $R^{22}$ is preferably a $C_1$-$C_3$ alkylene group. Rf is preferably a $C_7$-$C_{20}$ fluoroalkyl group having a perfluoroalkyl group at an end thereof.

Suitable examples of the compound represented by the formula (2) include (meth)acrylate compounds represented by the following formulae (2-1) to (2-3):

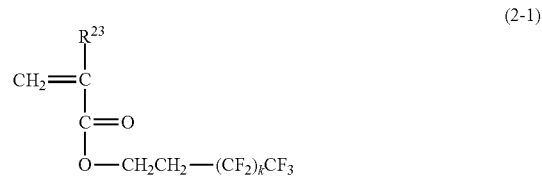

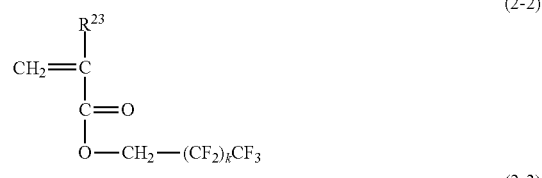

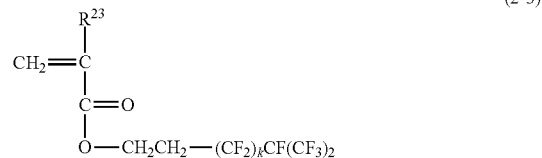

wherein $R^{23}$ represents a hydrogen atom or a methyl group, and k represents 7, 8, 9, 10, 11, or 12.

Specific examples of the fluoroalkyl group-containing monomer include 3,3,4,4,5,5,6,6,7,7,8,8,9,9,10,10,11,11,12,12,12-heneicosafluorododecyl acrylate ($H_2C$=$CHCO_2CH_2CH_2(CF_2)_9CF_3$), 3,3,4,4,5,5,6,6,7,7,8,8,9,9,10,10,10-heptadecafluorodecyl acrylate ($H_2C$=$CHCO_2CH_2CH_2(CF_2)_7CF_3$), $H_2C$=$CHCO_2CH_2$ $(CF_2)_9CF_3$, $H_2C$=$CHCO_2CH_2$ $(CF_2)_7CF_3$, 3,3,4,4,5,5,6,6,7,7,8,8,9,9,10,10,11,11,12,12,12-heneicosafluorododecyl methacrylate, 3,3,4,4,5,5,6,6,7,7,8,8,9,9,10,10,10-heptadecafluorodecyl methacrylate, 3-(perfluorobutyl)-2-hydroxypropyl acrylate ($F(CF_2)_4CH_2CH(OH)CH_2OCOCH$=$CH_2$), 3-perfluorohexyl-2-hydroxypropyl acrylate ($F(CF_2)_6$ $CH_2CH(OH)CH_2OCOCH$=$CH_2$), 3-(perfluoro-3-methylbutyl)-2-hydroxypropyl acrylate (($CF_3)_2CF(CF_2)_2CH_2CH$ $(OH)CH_2OCOCH$=$CH_2$), and 3-(perfluoro-5-methylhexyl)-2-hydroxypropyl acrylate (($CF_3)_2CF(CF_2)_4$ $CH_2$ $(OH)CH_2OCOCH$=$CH_2$). From the viewpoint of lowering the surface free energy, i.e. providing better sliding properties, preferred among the examples are 3,3,4,4,5,5,6,6,7,7,8,8,9,9,10,10,10-heptadecafluorodecyl acrylate ($H_2C$=$CHCO_2CH_2CH_2(CF_2)_7CF_3$), 3-(perfluorobutyl)-2-hydroxypropyl acrylate ($F(CF_2)_4CH_2CH(OH)$ $CH_2OCOCH$=$CH_2$), 3-perfluorohexyl-2-hydroxypropyl acrylate ($F(CF_2)_6CH_2CH(OH)CH_2OCOCH$=$CH_2$), 3-(perfluoro-3-methylbutyl)-2-hydroxypropyl acrylate (($CF_3)_2CF$ $(CF_2)_2CH_2CH(OH)CH_2OCOCH$=$CH_2$), and 3-(perfluoro-5-methylhexyl)-2-hydroxypropyl acrylate (($CF_3)_2CF(CF_2)_4$ $CH_2CH(OH)CH_2OCOCH$=$CH_2$). These may be used alone, or two or more of these may be used in combination.

The fluoroalkyl group-containing monomer may be a vinyl monomer having a fluoroalkyl group in a side chain, and especially preferably a monomer having a fluoroalkyl group at a side chain end thereof and also having an oxyalkylene group near its double bond site. Specifically, monomers represented by formula (3) below can be suitably used.

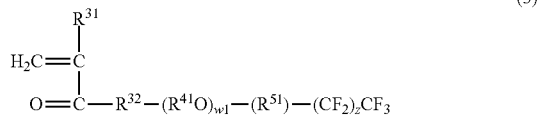

In the formula (3), $R^{31}$ represents a hydrogen atom, a methyl group, an ethyl group, or a propyl group; $R^{32}$ represents —O— or —NH—; $R^{41}$ represents a methylene group, an ethylene group, or a propylene group; $R^{51}$ represents a ketone group or is absent; w1 represents an integer of 1 to 100; and z represents an integer of 1 to 6.

Moreover, the fluoroalkyl group-containing monomer may suitably be a monomer represented by the following formula (4), (5), or (6):

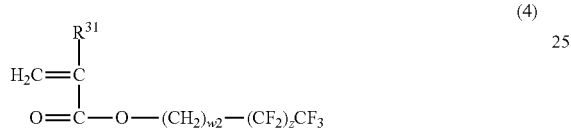

wherein $R^{31}$ represents a hydrogen atom, a methyl group, an ethyl group, or a propyl group; w2 represents an integer of 4 to 10; and z represents an integer of 1 to 6,

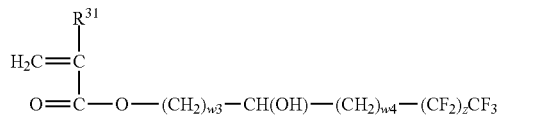

wherein $R^{31}$ represents a hydrogen atom, a methyl group, an ethyl group, or a propyl group; w3 and w4 each independently represent an integer of 1 to 6; and z represents an integer of 1 to 6,

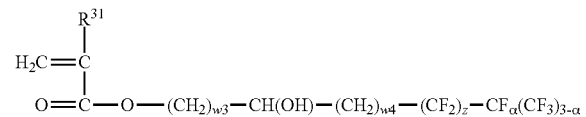

wherein $R^{31}$ represents a hydrogen atom, a methyl group, an ethyl group, or a propyl group; w3 and w4 each independently represent an integer of 1 to 6; z represents an integer of 1 to 6; and α represents an integer of 0 to 2.

A structure with high molecular mobility, such as $(R^{41}O)_{w1}$ or $(CH_2)_{w2}$, is preferably located between $CH_2=CR^{31}$, which forms a main chain by polymerization, and the fluoroalkyl group $(CF_2)_zCF_3$ because the $(CF_2)_zF_3$ or $CF_3$ group tends to be localized on the surface under dry conditions, thereby enhancing the sliding properties. Moreover, a structure capable of hydrogen bonding, such as OH, COOH, C=O, and NH groups, is preferably located between $CH_2=CR^{31}$, which forms a main chain by polymerization, and the fluoroalkyl group $(CF_2)_zF_3$ because the side chains are restrained so that the group $(CF_2)_zCF_3$ or $CF_3$ tends to be fixed or localized on the surface even under dry conditions, thereby enhancing the sliding properties.

Other preferred specific examples of the fluoro group-containing monomer include [1H,1H-perfluoro(2,5-dimethyl-3,6-dioxanonanoyl)]acrylate, [1H,1H-perfluoro(2,5-dimethyl-3,6-dioxanonanoyl)]methacrylate, pentafluorobenzyl acrylate, pentafluorobenzyl methacrylate, and 2,3,5,6-tetrafluorophenyl methacrylate, which are respectively represented by the following formulae:

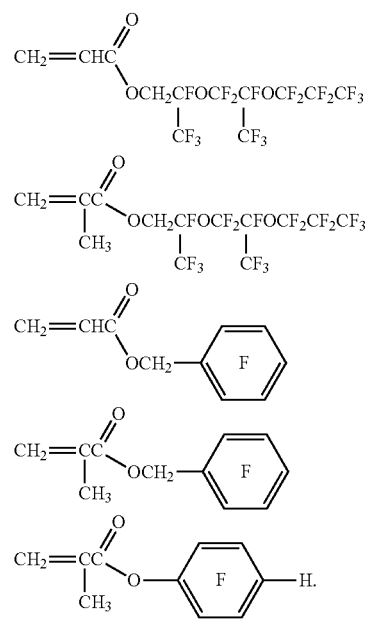

The functional monomer may be a zwitterionic monomer (a zwitterionic group-containing compound: a compound having both a center of permanent positive charge and a center of negative charge) such as carboxybetaines, sulfobetaines, and phosphobetaines. From the viewpoint of achieving excellent sliding properties and durability while maintaining favorable sealing properties, compounds represented by formula (7) below may be used as the zwitterionic monomer, and compounds represented by formula (8) below are suitable among these.

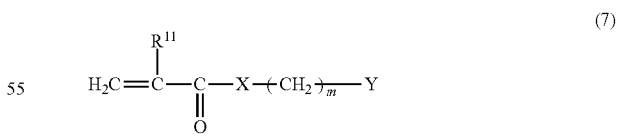

In the formula, $R^{11}$ represents —H or —CH$_3$; X represents —O— or —NH—; m represents an integer of 1 or larger; and Y represents a zwitterionic group.

In the formula (7), preferably, $R^{11}$ is —CH$_3$; X is —O—, and m is an integer of 1 to 10. Regarding the zwitterionic group represented as Y, examples of the cation include quaternary ammoniums such as tetraalkylammoniums, and examples of the anion include carboxylate, sulfonate, and phosphate.

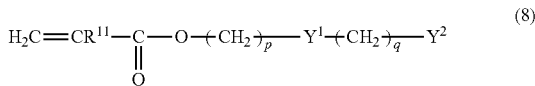

(8)

In the formula, $R^{11}$ represents —H or —CH$_3$; p and q each represent an integer of 1 or larger; and $Y^1$ and $Y^2$ are ionic functional groups having opposite electric charges to each other.

In the formula (8), p is preferably an integer of 2 or larger, and more preferably an integer of 2 to 10. q is preferably an integer of 1 to 10, and more preferably an integer of 2 to 4. The preferred $R^{11}$ is the same as mentioned above. The aforementioned cations and anions may be mentioned as $Y^1$ and $Y^2$.

Suitable typical examples of the zwitterionic monomer include compounds represented by the following formulae (8-1) to (8-4):

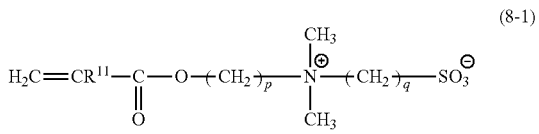

(8-1)

wherein $R^{11}$ represents a hydrogen atom or a methyl group; and p and q each represent an integer of 1 to 10,

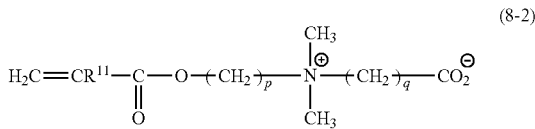

(8-2)

wherein $R^{11}$ represents a hydrogen atom or a methyl group; and p and q each represent an integer of 1 to 10,

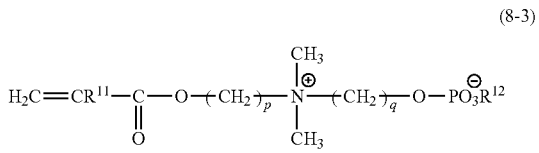

(8-3)

wherein $R^{11}$ represents a hydrogen atom or a methyl group; $R^{12}$ represents a $C_1$-$C_6$ hydrocarbon group; and p and q each represent an integer of 1 to 10, and

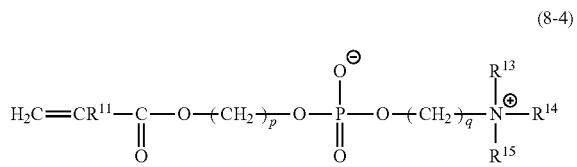

(8-4)

wherein $R^{11}$ represents a hydrogen atom or a methyl group; $R^{13}$, $R^{14}$, and $R^{15}$ are the same as or different from one another and each represent a $C_1$ or $C_2$ hydrocarbon group; and p and q each represent an integer of 1 to 10.

Examples of compounds represented by the formula (8-1) include dimethyl(3-sulfopropyl)(2-(meth)acryloyloxyethyl) ammonium betaine. Examples of compounds represented by the formula (8-2) include dimethyl(2-carboxyethyl)(2-(meth)acryloyloxyethyl)ammonium betaine. Examples of compounds represented by the formula (8-3) include dimethyl(3-methoxyphosphopropyl)(2-(meth)acryloyloxyethyl) ammonium betaine. Examples of compounds represented by the formula (8-4) include 2-(meth)acryloyloxyethyl phosphorylcholine. Other examples of the zwitterionic monomer include 2-(meth)acryloyloxyethyl carboxybetaine, and 2-(meth)acryloyloxyethyl sulfobetaine. Among these, 2-(meth)acryloyloxyethyl phosphorylcholine is particularly preferred from the viewpoint of providing high biocompatibility, in other words, low protein adsorbability.

Other examples of the functional monomer include silver acrylate, and silver methacrylate. Such a functional monomer enables to form polymer chains having antibacterial properties.

The functional polymer chains formed in the step 4 are preferably formed by polymerization of a fluoroalkyl group-containing monomer represented by the formula (2). In this case, the functional polymer chains provide excellent sliding properties and durability while allowing good sealing properties to be maintained. The non-functional polymer chains formed in the step 2 or the functional polymer chains formed in the step 4 preferably each have a polymerization degree of 20 to 200000, more preferably 350 to 50000.

The non-functional polymer chains formed in the step 2 or the functional polymer chains formed in the step 4 preferably each have a length of 10 to 50000 nm, more preferably 100 to 50000 nm. The polymer chains shorter than 10 nm are unlikely to provide good sliding properties. The polymer chains longer than 50000 nm are unlikely to provide further better sliding properties, while they are likely to drive up the cost of raw materials. Additionally, in such cases, surface patterns generated by the surface treatment are likely to be visible to the naked eye, which tends to spoil the appearance or to decrease the sealing properties.

The ratio of the non-functional polymer chains formed in the step 2 to the functional polymer chains formed in the step 4, calculated as the ratio of the number of polymer chains [(number of non-functional polymer chains)/(number of functional polymer chains)], is preferably 20/80 to 99.5/0.5, and more preferably 70/30 to 99.5/0.5. The ratio in that range enables to sufficiently provide the functions caused by both of these polymer chains, thereby favorably achieving the effects of the present invention.

Two or more species of non-functional monomers may be radically polymerized starting from the polymerization initiation points A in the step 2, and two or more species of functional monomers may be radically polymerized starting from the polymerization initiation points B in the step 4. Moreover, multiple kinds of non-functional polymer chains or multiple kinds of functional polymer chains may be grown on the surface of the object to be modified. Furthermore, crosslinking between polymer chains may be performed. In this case, ionic crosslinking, crosslinking by a hydrophilic group containing an oxygen atom, or crosslinking by a compound containing a halogen group (e.g., iodine) may be performed between the polymer chains.

Treatment of a rubber vulcanizate or a thermoplastic elastomer by the surface modification method enables to provide a surface-modified elastic body. For example, a surface-modified elastic body excellent in sliding properties in the presence of water or in a dry state can be provided. This surface-modified elastic body is excellent in that it has low friction and low water resistance or drag. Moreover, treatment of at least part of a three-dimensional solid (e.g., elastic body) by the above method enables to provide a surface-modified elastic body having better quality. Preferred examples of such surface-modified elastic bodies include polymer brushes. The polymer brush herein means an assembly of graft polymer chains obtained by the "grafting from" approach by surface-initiated living radical polymerization. The graft chains are preferably oriented in a direction substantially vertical to the surface of the object to be modified because, in such a case, the entropy is reduced and thus the molecular mobility of the graft chains is reduced, which ensures sliding properties. Preferred are semidilute brushes and concentrated brushes which have a brush density of 0.01 chains/nm$^2$ or higher.

Furthermore, treatment of a rubber vulcanizate or a thermoplastic elastomer by the surface modification method enables to produce a gasket for syringes at least partially having a modified surface. The modification is preferably performed at least on the sliding portion of the gasket surface, or may be performed on the entire surface.

FIG. 1 is an exemplary side view of an embodiment of the gasket for syringes. A gasket 1 shown in FIG. 1 has three circular protruding portions 11a, 11b and 11c each of which continuously protrudes along the circumferential direction on the outer periphery that is to be in contact with the inner periphery of a syringe barrel. Examples of the portion of the gasket 1 to which the surface modification is applied include: (1) the surfaces of protruding portions to be in contact with a syringe barrel, such as the circular protruding portions 11a, 11b and 11c; (2) the entire side surface including the circular protruding portions 11a, 11b and 11c; and (3) the entire side surface and a bottom surface 13.

Furthermore, when the grooves in the tread of a tire for use on vehicles such as passenger cars are treated by the surface modification method to form a polymer brush on the grooves, the fluid resistance of the groove surface on wet or snowy roads is reduced, and the contact angle with water is increased. Thus, the abilities to remove and drain water or snow are enhanced, resulting in improved grip performance.

Figure 2:
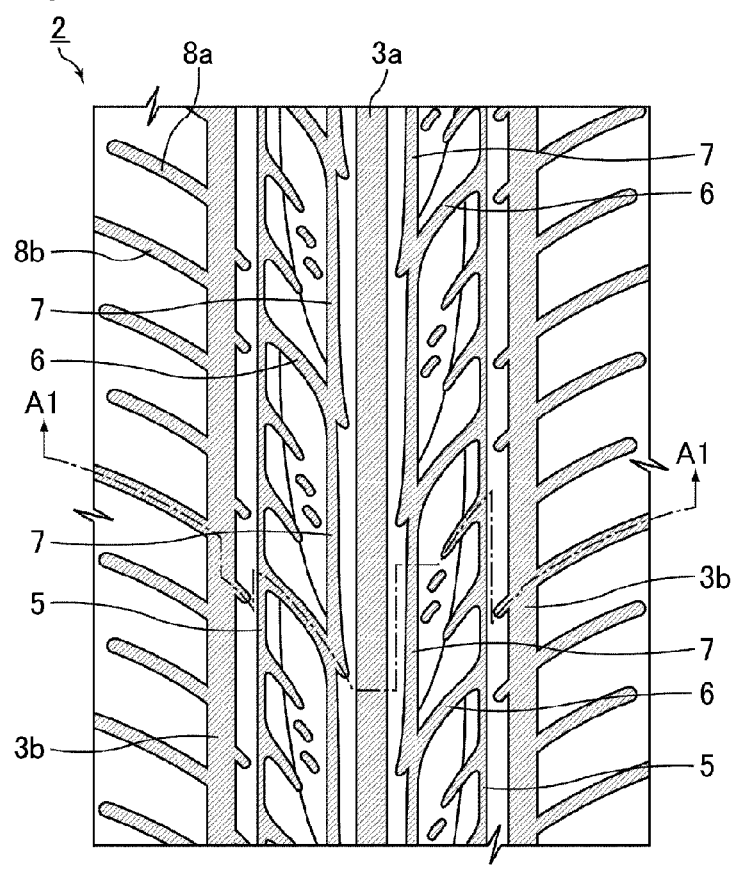
FIG. 2 is an exemplary development view of the tread portion of a pneumatic tire (the whole tire is not illustrated).
Figure 3:
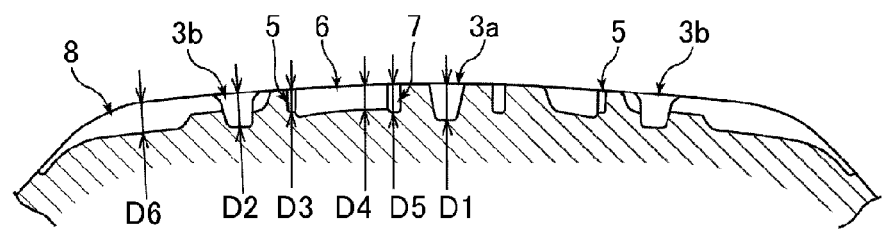
FIG. 3 is an exemplary A1-A1 cross-sectional view of FIG. 2.

FIG. 2 is an exemplary development view of a tread portion 2 of a pneumatic tire (the whole tire is not illustrated). FIG. 3 is an exemplary A1-A1 cross-sectional view of FIG. 2.

In FIGS. 2 and 3, a longitudinal center groove 3a (groove depth D1) and longitudinal shoulder grooves 3b (groove depth D2) are straight grooves linearly extending in the circumferential direction of the tire. Such straight grooves can contribute to low drainage resistance and high drainage performance during straight travelling.

The pneumatic tire also has fine grooves 5 (groove depth D3) extending in the tire circumferential direction on the side of the longitudinal shoulder groove 3b; beveled intermediate grooves 6 (groove depth D4) extending with an inclination from the fine groove 5 toward the longitudinal center groove 3a; connecting grooves 7 (groove depth D5) located inward of the fine grooves 5 in the axis direction of the tire and connecting the beveled intermediate grooves 6 next to one another in the circumferential direction of the tire; lateral shoulder grooves 8, 8a and 8b (groove depth D6) extending from the longitudinal shoulder groove 3b toward the outside of the tire; and the like. These grooves can also contribute to drainage performance. Treatment of these grooves by the above method enables to produce the aforementioned effects.

EXAMPLES

The following will describe the present invention in more detail, referring to, though not limited to, examples.

Example 1

A chlorobutyl rubber (degree of unsaturation: 1 to 2%) containing isoprene units was crosslinked by triazine to give a vulcanized rubber gasket (vulcanized at 180° C. for 10 minutes). This rubber vulcanizate was immersed in a solution of benzophenone in acetone (3 wt %) so that benzophenone was adsorbed on the surface of the rubber vulcanizate, followed by drying.

The dried vulcanized rubber gasket was immersed in an aqueous acrylic acid solution (2.5 M: prepared by dissolving 7.2 mL of acrylic acid in 32.8 mL of water; containing a polymerization inhibitor) in a glass reaction container. Then, the gasket was irradiated with an LED-UV light (2 mW/cm$^2$) with a wavelength of 365 nm for 30 minutes to cause radical polymerization to grow non-functional polymer chains (polyacrylic acid chains) on the surface of the rubber. Thereafter, the surface was washed with water and dried.

Next, the rubber vulcanizate on which polyacrylic acid chains were formed was again immersed in a solution of benzophenone in acetone (3 wt %) so that benzophenone was additionally adsorbed on the surface of the rubber vulcanizate where polyacrylic acid chains were formed, followed by drying.

Then, the dried rubber vulcanizate on which polyacrylic acid chains were formed was immersed in liquid 3-perfluorohexyl-2-hydroxypropyl acrylate (R1633, produced by Daikin Industries, Ltd.) monomer (containing a polymerization inhibitor). Thereto was added an aqueous riboflavin solution having a concentration of 1×10$^{-5}$ mol/L (the aqueous riboflavin solution was miscible with the liquid monomer, and the aqueous riboflavin solution layer was formed over the liquid monomer due to the higher specific gravity of the liquid monomer), and then the rubber vulcanizate was irradiated with a LED-UV light with a wavelength of 365 nm for 5 hours to cause radical polymerization to further grow functional polymer chains on the surface of the rubber. In this manner, a surface-modified elastic body (polymer brush) was prepared.

Example 2

A surface-modified elastic body (polymer brush) was prepared as in Example 1, except that 2-(meth)acryloyloxyethyl phosphorylcholine was used instead of 3-perfluorohexyl-2-hydroxypropyl acrylate, and the polymerization time was changed to 2 hours.

Example 3

A chlorobutyl rubber (degree of unsaturation: 1 to 2%) containing isoprene units was crosslinked by triazine to give a vulcanized rubber gasket (vulcanized at 180° C. for 10 minutes). This rubber vulcanizate was immersed in a solution of 2,4-diethylthioxanthone in acetone (3 wt %) so that 2,4-diethylthioxanthone was adsorbed on the surface of the rubber vulcanizate, followed by drying.

The dried vulcanized rubber gasket was immersed in an aqueous acrylamide solution (2.5 M: prepared by dissolving 7.1 g of acrylamide in 32.8 mL of water) in a glass reaction container. Then, the gasket was irradiated with an LED-UV light (2 mW/cm$^2$) with a wavelength of 365 nm for 45 minutes to cause radical polymerization to grow non-functional polymer chains (polyacrylamide chains) on the surface of the rubber. Thereafter, the surface was washed with water and dried.

Next, the resulting rubber vulcanizate on which polyacrylamide chains were formed was again immersed in a solution of 2,4-diethylthioxanthone in acetone (3 wt %) so that 2,4-diethylthioxanthone was additionally adsorbed on the surface of the rubber vulcanizate where polyacrylamide chains were formed, followed by drying.

Then, liquid 3-perfluorohexyl-2-hydroxypropyl acrylate (R1633, produced by Daikin Industries, Ltd.) monomer (containing a polymerization inhibitor) was applied to the surface of the dried rubber vulcanizate where polyacrylamide chains were formed. The rubber vulcanizate to which the liquid monomer was applied was immersed in an aqueous riboflavin solution having a concentration of $1 \times 10^{-5}$ mol/L, and then irradiated with a LED-UV light with a wavelength of 365 nm for 5 hours to cause radical polymerization to further grow functional polymer chains on the surface of the rubber. In this manner, a surface-modified elastic body (polymer brush) was prepared.

Example 4

A surface-modified elastic body (polymer brush) was prepared as in Example 3, except that 3,3,4,4,5,5,6,6,7,7,8,8,9,9,10,10,10-heptadecafluorodecyl acrylate was used instead of 3-perfluorohexyl-2-hydroxypropyl acrylate.

Example 5

A surface-modified elastic body (polymer brush) was prepared as in Example 3, except that 2-(meth)acryloyloxyethyl phosphorylcholine was used instead of 3-perfluorohexyl-2-hydroxypropyl acrylate, and the polymerization time was changed to 1 hour.

Comparative Example 1

A chlorobutyl rubber (degree of unsaturation: 1 to 2%) containing isoprene units was crosslinked by triazine to give a rubber vulcanizate (vulcanized at 180° C. for 10 minutes), which was then used as it was.

The surface-modified elastic bodies prepared in the examples and comparative example were evaluated by the following methods.

(Length of Polymer Chain)

For determination of the length of the polymer chain formed on the surface of the rubber vulcanizate, a cross section of the modified rubber on which the polymer chains were formed was measured with an SEM at an accelerating voltage of 15 kV and a magnification of 1000 times. The thickness of the polymer layer photographed was determined as the length of the polymer chain. It should be noted that the length of the non-functional polymer chain was the same as the length of the functional polymer chain.

(Friction Resistance)

The friction resistance of the surface of the surface-modified elastic body was measured as follows. The vulcanized rubber gasket (polymer brush) prepared in each of the examples and comparative example was inserted into a COP resin barrel of a syringe and further pushed (push rate: 30 mm/min) in the barrel using a tensile tester while the friction resistance was measured. The friction resistance of each gasket prepared in the examples is expressed as a friction resistance index relative to that of Comparative Example 1 (=100), calculated according to the equation shown below. A smaller index indicates a lower friction resistance.

(Friction resistance index)=(Friction resistance of each example)/(Friction resistance of Comparative Example 1)×100

TABLE 1

|  | Example | | | | | Comparative Example |
| --- | --- | --- | --- | --- | --- | --- |
|  | 1 | 2 | 3 | 4 | 5 | 1 |
| Length of polymer chain (nm) | 12000 | 13000 | 8500 | 8700 | 10000 | — |
| Ratio of the number of polymer chains [(Number of non-functional polymer chains)/(Number of functional polymer chains)] | 85/15 | 80/20 | 90/10 | 90/10 | 86/14 | — |
| Friction resistance index | 2.0 | 2.5 | 1.8 | 1.9 | 2.3 | 100 |

The results in Table 1 show that the surfaces of the surface-modified elastic bodies prepared in the examples had greatly reduced friction resistance, and therefore had good sliding properties. Moreover, since only the surface was modified, the sealing properties of the surface-modified elastic bodies were the same as that in Comparative Example 1.

Thus, when used for a gasket of a syringe plunger, the present invention achieves sufficient sealing properties and reduces the friction of the plunger with the syringe barrel, which enables the treatment with the syringe to be easily and accurately performed. Moreover, since the gasket has a small difference between the coefficient of static friction and the coefficient of dynamic friction, start of pushing the plunger and the subsequent inward movement of the plunger can be smoothly performed without pulsation. Furthermore, in the case where polymer chains are formed on the inner surface of a syringe barrel formed from a thermoplastic elastomer, treatment with the syringe can be easily performed similarly as described above.

Furthermore, the aforementioned effects can be expected when polymer chains are formed on the surfaces of the grooves on treads, or sidewalls of tires used on vehicles such as passenger cars, on the surfaces of diaphragms, on the sliding surfaces of skis or snowboards, or on the surfaces of swimsuits, road signs, sign boards, or the like.

REFERENCE SIGNS LIST

1: gasket
11a, 11b, 11c: circular protruding portion
13: bottom surface
2: tread portion
3a: longitudinal center groove
3b: longitudinal shoulder groove
5: fine groove 6: beveled intermediate groove
7: connecting groove
8, 8a, 8b: lateral shoulder groove

The invention claimed is:

1. A surface modification method for surface-modifying an object of a rubber vulcanizate or a thermoplastic elastomer, the method comprising:
   step 1 of forming polymerization initiation points A on a surface of the object by adsorbing a polymerization initiator A onto the surface of the object;
   step 2 of radically polymerizing a non-functional monomer, starting from the polymerization initiation points A, to grow non-functional polymer chains;
   step 3 of forming polymerization initiation points B on the surface of the object where the non-functional polymer chains are formed by adsorbing a polymerization initiator B onto the surface of the object where the non-functional polymer chains are formed; and
   step 4 of radically polymerizing a functional monomer, starting from the polymerization initiation points B, to grow functional polymer chains,
   wherein
   the rubber vulcanizate or thermoplastic elastomer contains an allylic carbon atom,
   the non-functional monomer is at least one member selected from the group consisting of acrylic acid, acrylic acid esters, acrylic acid alkali metal salts, acrylic acid amine salts, methacrylic acid, methacrylic acid esters, methacrylic acid alkali metal salts, methacrylic acid amine salts, acrylonitrile, acrylamide, dimethylacrylamide, diethylacrylamide, isopropylacrylamide, hydroxyacrylamide, acryloyl morpholine, methacrylamide, dimethylmethacrylamide, diethylmethacrylamide, isopropylmethacrylamide, hydroxymethacrylamide, and methacryloyl morpholine, and
   the functional monomer is at least one member selected from the group consisting of a fluoro group-containing monomer, a zwitterionic monomer that has a carboxybetaine group, a sulfobetaine group, or a phosphobetaine group in a side chain thereof, 2-(meth)acryloyloxyethyl phosphorylcholine, 2-(meth)acryloyloxyethyl carboxybetaine, 2-(meth)acryloyloxyethyl sulfobetaine, silver acrylate, and silver methacrylate.

2. The surface modification method according to claim 1, wherein the step 1 comprises irradiating the surface of the object with LED light with a wavelength of 300 to 400 nm and forming the polymerization initiation points A from a polymerization initiator A present on the surface, and
   the step 3 comprises irradiating the surface of the object where the non-functional polymer chains are formed with LED light with a wavelength of 300 to 400 nm and forming the polymerization initiation points B from a polymerization initiator B present on the surface.

3. The surface modification method according to claim 1, wherein the polymerization initiator is a benzophenone compound and/or a thioxanthone compound.

4. The surface modification method according to claim 1, wherein a reducing agent or an antioxidant is mixed into a reaction medium in at least one step selected from the group consisting of the step 2 radical polymerization of the non-functional monomer and the step 4 radical polymerization of the functional monomer.

5. The surface modification method according to claim 4, wherein the reducing agent or the antioxidant is at least one selected from the group consisting of riboflavin, ascorbic acid, α-tocopherol, β-carotene, and uric acid.

6. The surface modification method according to claim 1, wherein an inert gas is inserted into a reaction container into which a reaction solution has been already placed during or before light irradiation, thereby replacing the atmosphere in the container with an inert gas atmosphere, and then at least one step selected from the group consisting of the radical polymerization of the non-functional monomer in the step 2 and the radical polymerization of the functional monomer in the step 4 is carried out in the inert gas atmosphere.

7. The surface modification method according to claim 1, wherein the fluoro group-containing monomer is a fluoroalkyl group-containing monomer.

8. The surface modification method according to claim 7, wherein the fluoroalkyl group-containing monomer is at least one selected from the group consisting of
   3,3,4,4,5,5,6,6,7,7,8,8,9,9,10,10,11,11,12,12,12-heneicosafluorododecyl acrylate ($H_2C$=$CHCO_2CH_2CH_2(CF_2)_9CF_3$),
   3,3,4,4,5,5,6,6,7,7,8,8,9,9,10,10,10-heptadecafluorodecyl acrylate ($H_2C$=$CHCO_2CH_2CH_2(CF_2)_7CF_3$),
   3-(perfluorobutyl)-2-hydroxypropyl acrylate ($F(CF_2)_4CH_2CH(OH)CH_2OCOCH$=$CH_2$),
   3-perfluorohexyl-2-hydroxypropyl acrylate ($F(CF_2)_6CH_2CH(OH)CH_2OCOCH$=$CH_2$),
   3-(perfluoro-3-methylbutyl)-2-hydroxypropyl acrylate (($CF_3$)$_2CF(CF_2)_2CH_2CH(OH)CH_2OCOCH$=$CH_2$), and
   3-(perfluoro-5-methylhexyl)-2-hydroxypropyl acrylate (($CF_3$)$_2CF(CF_2)_4CH_2CH(OH)CH_2OCOCH$=$CH_2$).

9. The surface modification method according to claim 7, wherein the fluoroalkyl group-containing monomer is a compound represented by the following formula (3), (4), (5), or (6):

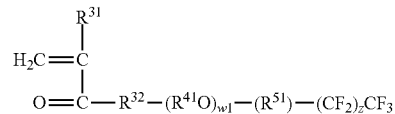

(3)

wherein $R^{31}$ represents a hydrogen atom, a methyl group, an ethyl group, or a propyl group; $R^{32}$ represents —O— or —NH—; $R^{41}$ represents a methylene group, an ethylene group, or a propylene group; $R^{51}$ represents a ketone group or is absent; w1 represents an integer of 1 to 100; and z represents an integer of 1 to 6,

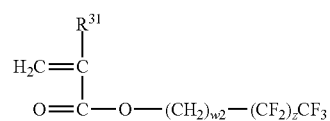

(4)

wherein $R^{31}$ represents a hydrogen atom, a methyl group, an ethyl group, or a propyl group; w2 represents an integer of 4 to 10; and z represents an integer of 1 to 6,

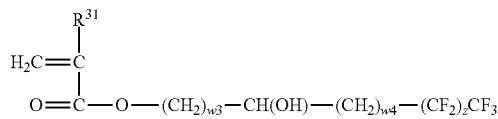

(5)

wherein R³¹ represents a hydrogen atom, a methyl group, an ethyl group, or a propyl group; w3 and w4 each independently represent an integer of 1 to 6; and z represents an integer of 1 to 6,

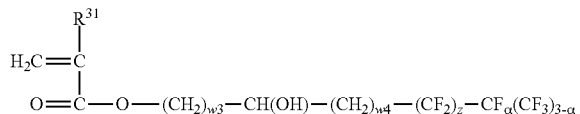

(6)

wherein R³¹ represents a hydrogen atom, a methyl group, an ethyl group, or a propyl group; w3 and w4 each independently represent an integer of 1 to 6; z represents an integer of 1 to 6; and a represents an integer of 0 to 2.

10. The surface modification method according to claim 1, wherein the fluoro group-containing monomer is a fluoroalkylene oxide group-containing monomer or a fluorobenzyl group-containing monomer.

11. The surface modification method according to claim 1, wherein the fluoro group-containing monomer is at least one selected from the group consisting of
[1H,1H-perfluoro(2,5-dimethyl-3,6-dioxanonanoyl)] acrylate,
[1H,1H-perfluoro(2,5-dimethyl-3,6-dioxanonanoyl)] methacrylate,
pentafluorobenzyl acrylate,
pentafluorobenzyl methacrylate, and
2,3,5,6-tetrafluorophenyl methacrylate.

12. The surface modification method according to claim 1,
wherein the nonfunctional monomer in step 2 is in a liquid state and contains a polymerization inhibitor, or a solution thereof contains a polymerization inhibitor, and said nonfunctional monomer is polymerized in the presence of the polymerization inhibitor, and
wherein the functional monomer in step 4 is in a liquid state and contains a polymerization inhibitor, or a solution thereof contains a polymerization inhibitor, and said functional monomer is polymerized in the presence of the polymerization inhibitor.

13. The surface modification method according to claim 12, wherein the polymerization inhibitor is 4-methylphenol.

14. The surface modification method according to claim 1, wherein total polymer chains comprising the non-functional polymer chains and the functional polymer chains each have a length of 10 to 50000 nm.

15. The surface modification method according to claim 1, wherein a ratio between a length of the non-functional polymer chain and a length of the functional polymer chain is 50:50 to 99.9:0.01.

* * * * *